United States Patent [19]
Yoshino

[11] Patent Number: 6,058,906
[45] Date of Patent: May 9, 2000

[54] FUEL/AIR RATIO CONTROL FOR INTERNAL COMBUSTION ENGINE

[75] Inventor: Takahiro Yoshino, Yokohama, Japan

[73] Assignee: Nissan Motor Co., Ltd., Yokohama, Japan

[21] Appl. No.: 09/109,049

[22] Filed: Jul. 2, 1998

[30] Foreign Application Priority Data

Jul. 2, 1997 [JP] Japan .................................. 9-177260

[51] Int. Cl.[7] ............................ F02B 17/00; F02D 43/00
[52] U.S. Cl. ................... 123/295; 123/305; 123/406.47; 123/406.48; 123/568.21
[58] Field of Search .................................. 123/295, 305, 123/406.47, 406.48, 430, 568.21

[56] References Cited

U.S. PATENT DOCUMENTS 5,722,363 3/1998 Iida et al. .................................. 123/305
5,738,074 4/1998 Nakamura et al. ...................... 123/305
5,875,756 3/1999 Kamura et al. .......................... 123/295

FOREIGN PATENT DOCUMENTS 62-110536 5/1987 Japan .

*Primary Examiner*—Tony M. Argenbright
*Attorney, Agent, or Firm*—Foley & Lardner

[57] ABSTRACT

An engine system for an internal combustion engine of a type having a stratified combustion mode and a homogeneous combustion mode comprises a controller for increasing a fuel air ratio (or equivalence ratio) of an air fuel mixture produced in the engine abruptly in a transient state during transition from the stratified mode to the homogenous mode to ensure stable combustion. The controller estimates a residual EGR gas quantity, and produces a step change in the fuel air ratio when the fuel air ratio enters a predetermined unstable range and the EGR gas still remains in a considerable amount.

18 Claims, 11 Drawing Sheets

FUEL/AIR RATIO CONTROL FOR INTERNAL COMBUSTION ENGINE

BACKGROUND OF THE INVENTION

The present invention relates to an internal combustion engine, and more specifically to an engine system capable of changing a combustion mode in an internal combustion engine between a stratified charge combustion mode and a homogeneous charge combustion mode.

A conventional engine control system (as disclosed in Japanese Patent Provisional (Kokai) Publication No. 62(1987)-110536) employs an electronically controlled throttle valve for electronically controlling a throttle opening to achieve a desired target engine torque determined from operating parameters such as the driver's accelerator input and engine speed. However, this system is unable to control the fuel air ratio adequately.

On the other hand, the technique of in-cylinder direct fuel injection in a spark ignition engine is under development to improve the fuel efficiency and emission performance by selectively using stratified charge combustion and homogeneous charge combustion.

In a low and medium load region, a control system for such a type operates an engine in a stratified combustion mode by injecting fuel directly into a combustion chamber during the compression stroke so as to produce a stratified combustible mixture only around the spark plug. The thus-achieved stratified combustion enables stable combustion with an ultra lean mixture, and hence significant improvement in the fuel efficiency and emission performance of the engine.

In a high load region over a predetermined engine load, the engine is operated in a homogeneous combustion mode to meet a demand for higher output torque. In the homogeneous combustion mode, fuel. is injected during the intake stroke so as to produce a homogeneous air fuel mixture. (In some examples, a fuel injection valve is provided separately in an intake port.)

The control system changes over the combustion control mode between the stratified combustion mode and the homogeneous combustion mode in accordance with one or more engine operating conditions.

SUMMARY OF THE INVENTION

It is an object of the present invention to provide apparatus and method capable of ensuring the stability of combustion and the smoothness of combustion changeover by controlling an equivalence ratio (or fuel/air ratio) of an internal combustion engine adequately in a changeover from a stratified combustion mode to a homogeneous combustion mode.

According to the present invention, an apparatus or process for changing combustion in an internal combustion engine between a stratified charge combustion mode and a homogeneous charge combustion mode, comprises at least a controller or controlling step for varying a fuel/air ratio (or equivalence ratio) gradually from a first ratio level for the stratified charge combustion mode to a second ratio level for the homogeneous charge combustion mode to achieve a changeover from the stratified mode to the homogeneous mode, and for changing the fuel/air ratio steeply toward the second ratio level, instead of varying the fuel/air ratio gradually, when the fuel air ratio enters a predetermined unstable range in a transient state during transition from the stratified combustion mode to the homogeneous combustion mode.

The apparatus or process may comprise: a condition discriminating section or step for producing a discrimination signal when the fuel/air ratio enters the unstable range in the transient state during transition from the stratified combustion mode to the homogeneous combustion mode; and a controlling section or step for increasing the fuel/air ratio gradually from the first ratio level to the second ratio level when the discrimination signal is absent, and for interrupting a gradual increase of the fuel/air ratio and instead producing a forcible steep change in the fuel air ratio to increase the fuel air ratio to an enriched level outside the unstable range when the discrimination signal is present.

DETAILED DESCRIPTION OF THE INVENTION

Figure 2:
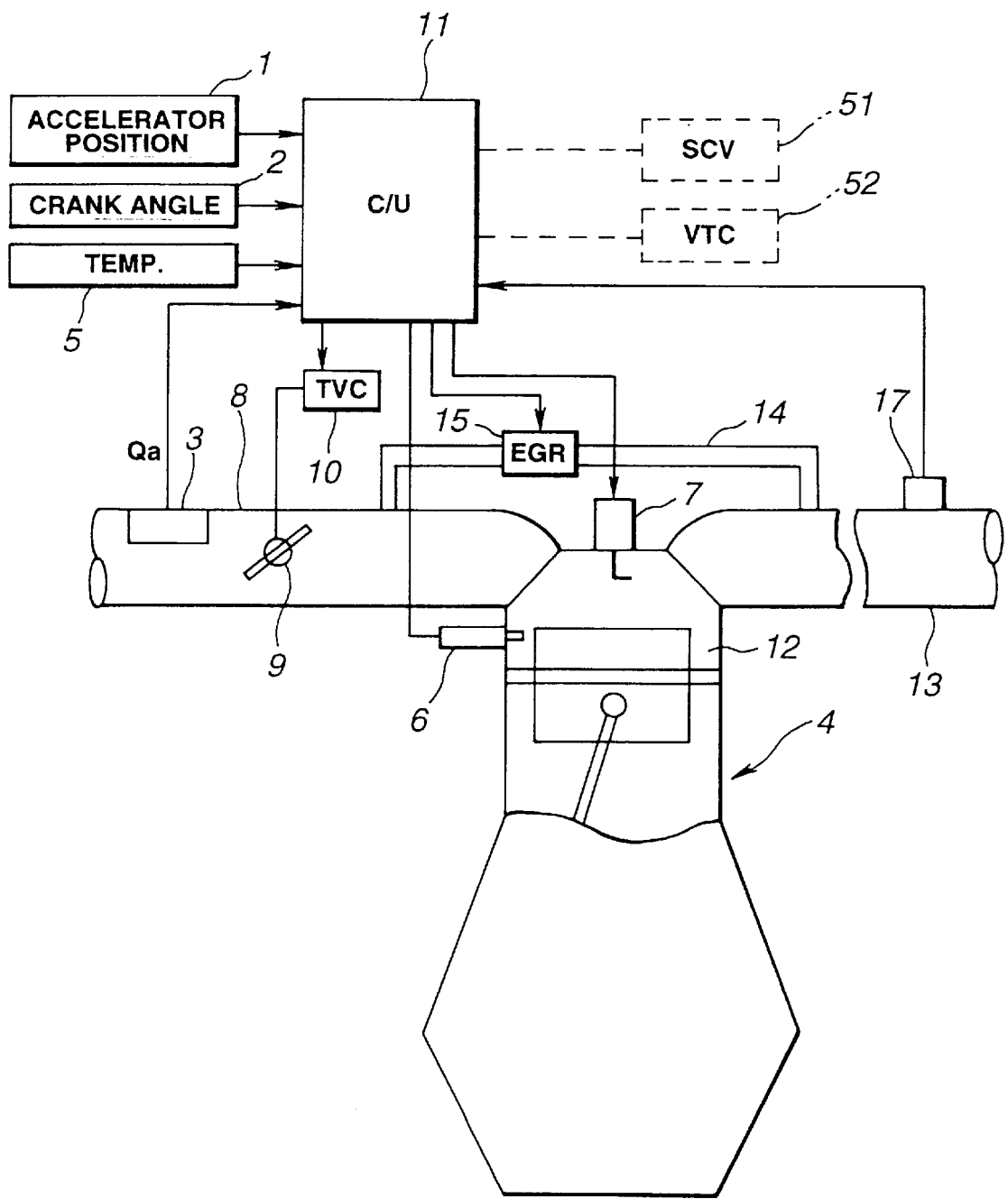
FIG. 2 is a schematic view showing an engine system according to one embodiment of the present invention.

FIG. 2 shows an engine system according to one embodiment of the present invention. In this embodiment, the engine system is in the form of a control system inclusive of an input section including a group of input devices such as sensors, a control section and an output section including devices serving as actuators.

The input section of this example comprises an accelerator sensor 1 for sensing a condition of an accelerating system, a crank angle sensor 2, an air flow sensor (or air flow meter) 3 for sensing an intake air quantity for an internal combustion engine 4, and a water temperature sensor 5 for sensing the temperature of an engine cooling water. The accelerator sensor 1 of this example senses a depression degree (or opening degree) of an accelerator pedal of a vehicle on which this engine system is mounted. The crank angle sensor 2 of this example produces a position signal signaling each unit crank angle, and a reference signal signaling each cylinder stroke phase difference. The control system can sense the engine speed Ne by measuring the number of pulses per unit time of the position signal, or measuring the period of occurrence of pulses of the reference signal.

The engine system further comprises a fuel injector 6 and a spark plug 7 for each cylinder. The fuel injector 6 of each cylinder injects fuel directly into the combustion chamber of the engine 4 in response to a fuel injection control signal, and the spark plug 7 initiates ignition in the combustion chamber. A throttle valve 9 is disposed in an intake air passage 8 of the engine 4. A throttle valve control unit (TVC) 10 is arranged to electronically control the opening degree of the throttle valve 9 with a throttle actuator such as a DC motor. The throttle valve 9 serves as an intake air control actuator for controlling a fresh intake air quantity to the engine 4. The fuel injectors 6 are controlled in one of a stratified combustion mode and a homogeneous combustion mode. In low and medium load regions, the fuel injector 6 of each cylinder injects the fuel into the combustion chamber in the compression stroke to produce stratified combustible mixture closely around the spark plug 7 and thereby achieve stratified combustion with a very lean air fuel mixture. In a high load region, the fuel injector 6 of each cylinder is controlled in the homogeneous combustion mode, and injects fuel into the combustion chamber in the intake stroke to achieve homogeneous combustion to provide more power output. The fuel injectors 6 serve as an actuator for controlling the fuel supply quantity to the engine 4.

An engine control unit 11 receives signals from the input section to collect input information on engine operating conditions, and controls the opening degree of the throttle valve 9 through the throttle control unit 10, the fuel injection quantity (or fuel supply quantity) and fuel injection timing of each fuel injector 6 and the ignition timing of each spark plug 7 in accordance with the engine operating conditions.

Figure 1:
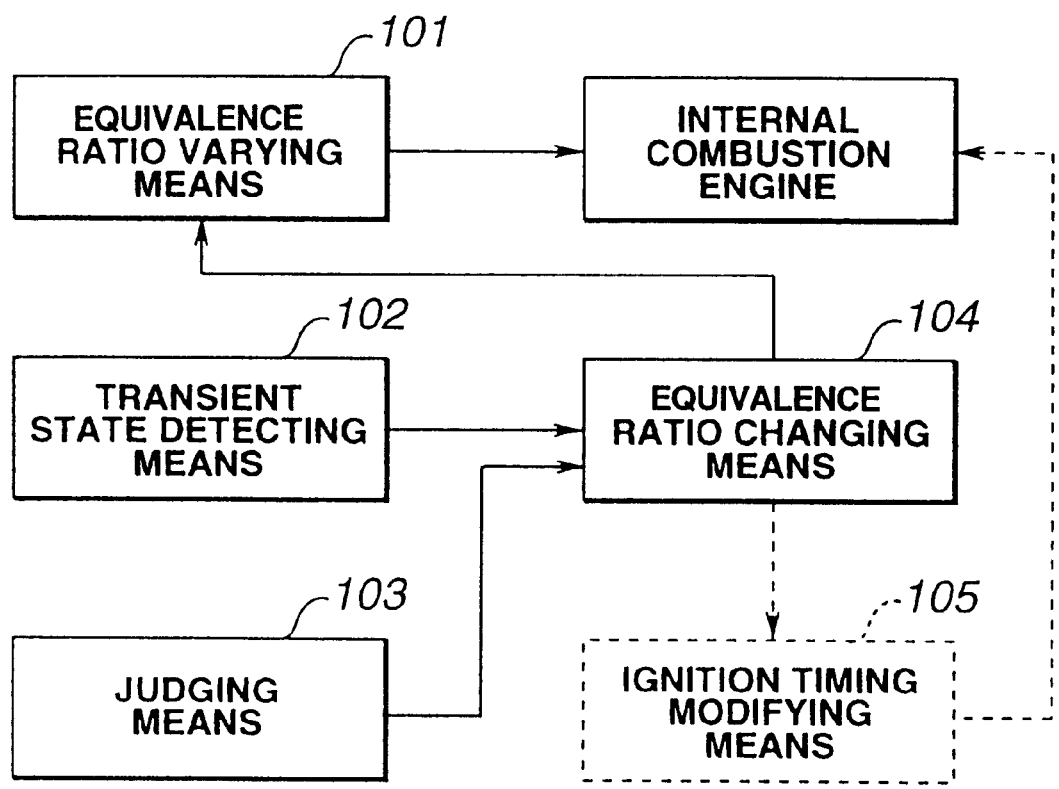
FIG. 1 is a block diagram showing, as an example, an arrangement of functional means that can be employed in the present invention.

The engine control unit 11 is a main component in the control section of the control system. In this example, the control unit 11 includes at least one computer including at least a central processing unit (CPU), a memory section having ROM and RAM and input and output sections. The engine control unit 11 in this example serves as first means 101, as shown in FIG. 1, for varying an equivalence ratio (proportional to a fuel/air ratio) gradually from a first ratio level adapted to the stratified combustion mode to a second ratio level adapted to the homogeneous combustion mode, second means 102 for detecting a predetermined transient state in transition from the stratified mode to the homogeneous mode, third means 103 for judging whether the equivalence ratio being varied gradually by the first means enters a predetermined unstable range in the transient state, fourth means 104 for causing a forcible step change in the equivalence ratio in the process of the gradual variation to force the equivalence ratio out of the unstable range into a stable range favorable to the stability of combustion if third means judges that the equivalence ratio enters the unstable range, and fifth means for modifying the ignition timing of the engine in accordance with the forcible step change in the equivalence ratio to prevent unwanted torque variation.

The fuel injectors 6 are components of the fuel system of the engine 4, which in this example is the fuel injection system. The spark plugs 7 are components of the ignition system of the engine 4. The engine system further includes the intake system constituted by the intake passage 8, the throttle valve 9 etc., the exhaust system including at least an exhaust gas passage 13 of the engine 4, and an EGR (exhaust gas recirculating) system connecting the exhaust system with the intake system.

The EGR system of the engine 4 comprises an EGR passage 14 connecting the exhaust passage 13 with the intake passage 8, and an EGR control valve 15 disposed in the EGR passage 14, for controlling an EGR condition. The EGR control valve 15 varies its opening degree and thereby controls the amount of EGR in response to an EGR control signal supplied from the engine control unit 11. The control system of this example performs an EGR control during an engine operation in the stratified combustion mode, but prohibits the EGR control to maintain the combustibility in a homogeneous lean combustion mode when the combustion mode is changed from the stratified combustion to the homogeneous lean mode. The control system carries out the EGR control again in a homogeneous richer combustion mode (or homogeneous stoichiometric combustion mode) in which a feedback control is performed at or near the theoretical air fuel ratio.

The engine control unit 11 of this example further controls an in-cylinder air flow condition by sending an SCV control signal to a swirl control system 51 in accordance with one or more engine operating conditions. Specifically, the swirl control system 51 is arranged to control a swirl condition in each cylinder of the engine 4 by controlling an opening of a swirl control valve disposed in or near an intake port, for regulating an air flow flowing into the cylinder, in such a manner to suit the swirl condition to the combustion mode selected from the homogeneous combustion mode and the stratified combustion mode.

The engine control unit 11 of this example further controls valve timings of intake and exhaust valves of the engine 4 by sending a VTC control signal to a valve timing control system 52 in accordance with one or more engine operating conditions. Specifically, the valve timing control system 52 is arranged to control valve opening timing, valve closing timing and valve overlap of the engine 4 in such a manner to suit the valve timing conditions to the combustion mode selected from the homogeneous combustion mode and the stratified combustion mode. It is possible to employ, as the VTC system 52 of this control system, one of known VTC devices. For example, the VTC system 52 may be arranged to vary the valve timing by varying a phase angle of a cam shaft with respect to a crank shaft of the engine 4.

In the example of FIG. 2, an air fuel ratio sensor 17 is provided in the exhaust passage 13, for sensing the air fuel ratio of the air fuel mixture by sensing a concentration of a predetermined component such as oxygen in the exhaust gas mixture.

Figure 3:
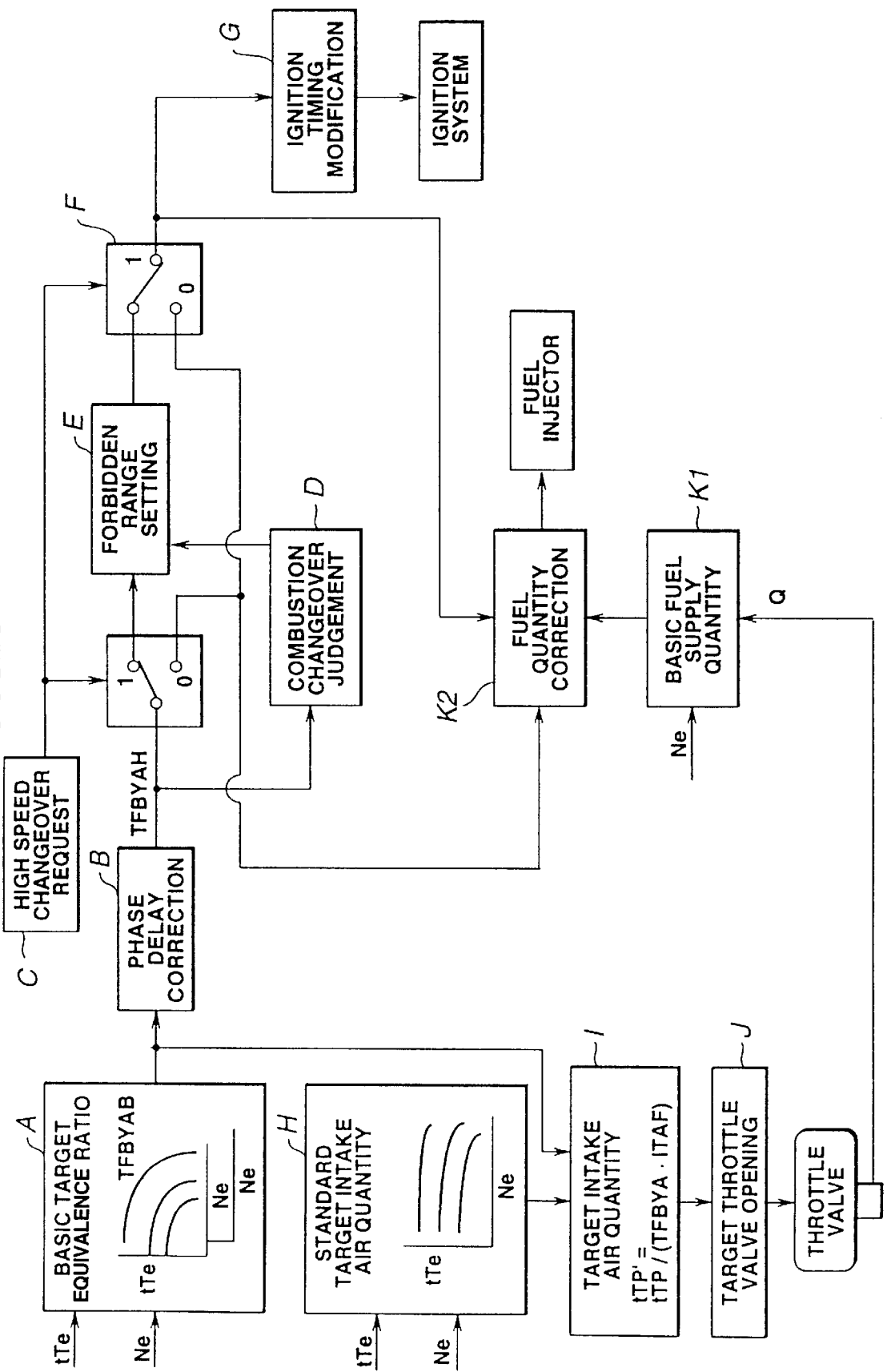
FIG. 3 is a block diagram showing functional sections of the engine system of FIG. 2.

FIG. 3 shows functional sections in the control system of this example.

A basic target equivalence ratio calculating section A calculates a basic target equivalence ratio TFBYAB in accordance with basic engine operating parameters. For example, the basic target equivalence ratio TFBYAB is determined in accordance with the engine speed Ne and a target torque tTe by information retrieval from maps. In this example, the target torque tTe is a parameter determined from the accelerator depression degree APS and the engine speed Ne. The appropriateness of an engine operation at a lean air fuel ratio depends on various other vehicle operating conditions such as the cooling water temperature, the elapsed time from a start of the engine, the vehicle speed, the acceleration of the vehicle, the load of accessory systems at idle. Furthermore, the combustion mode is changed over between the homogeneous mode and the stratified mode. Therefore, the control system of this example employs a plurality of the maps for determining the basic target equivalence ratio TFBYAB, in order to take into consideration the various other vehicle operating conditions as secondary parameters supplementing the basic engine operating parameters such as Ne and tTe.

A phase delay correcting (or phase delay compensating) section B calculates a phase delayed target equivalence ratio TFBYAH by performing a phase delay correcting operation on the basic target equivalence ratio TFBYAB of the section A. When the basic target equivalence ratio TFBYAB is changed in accordance with a change in the engine operating conditions, the control system follows the change in the basic target equivalence ratio by changing the intake air quantity and the fuel supply quantity to the engine 4. In this case, however, the control system cannot change the actual intake air quantity immediately in response to the change in the basic target equivalence ratio, because of a lag in movement of the throttle valve 9 and a lag of the intake air due to the volume of the intake system. By contrast to this, the fuel injection system of the type injecting the fuel directly into the combustion chamber 12 can change the fuel quantity almost immediately with little or no delay relative to the change in the basic target equivalence ratio. As a result, the actual equivalence ratio lags behind the basic target equivalence ratio. This control system, therefore, determines the delayed target equivalence ratio TFBYAH so as to correspond to the lag in the actual equivalence ratio.

In this example, the phase delay correcting section B performs the phase delay correction by using a delay correction coefficient for providing at least one first order lag corresponding to the lag in movement of the throttle valve 9 and the lag due to the volume of the intake system. It is optional to use a weighted average as a first order lag correction. To simplify the system, it is possible to employ a delay correction only for the more influential transportation lag by the intake system's volume.

The basic target equivalence ratio calculating section A and the phase delay correcting section B correspond to the equivalence ratio varying means 101 of FIG. 1.

A high speed changeover requesting section C determines whether there exists an acceleration request, by monitoring an acceleration demand parameter determined in accordance with one or more operating conditions. For example, the high speed changeover requesting section C determines the existence or nonexistence of the acceleration request in accordance with a variation of a standard target intake air quantity tTP (calculated by a standard target intake air quantity calculating section H) or the driver's accelerator operation quantity APS (or the driver's accelerator input) (or a variation of APS). The high speed changeover requesting section C is arranged to produce a high speed changeover request signal in a situation requiring an immediate changeover of combustion from the stratified combustion to the homogeneous combustion without waiting until completion of changeover of the EGR system or the SCV system or the VTC system. When the high speed changeover request signal is generated, the control unit 11 immediately starts a changeover operation for changing over each of the EGR system, SCV system and the VTC system, and carries out a changeover of the combustion in accordance with the phase delayed target equivalence ratio. When a normal combustion changeover is desired and hence there is no request for a high speed changeover, the control unit 11 waits for the completion of changeover of the EGR, SCV and VTC systems, and then carries out a changeover of combustion by monitoring the phase delayed equivalence ratio TFBYAH.

Figure 5:
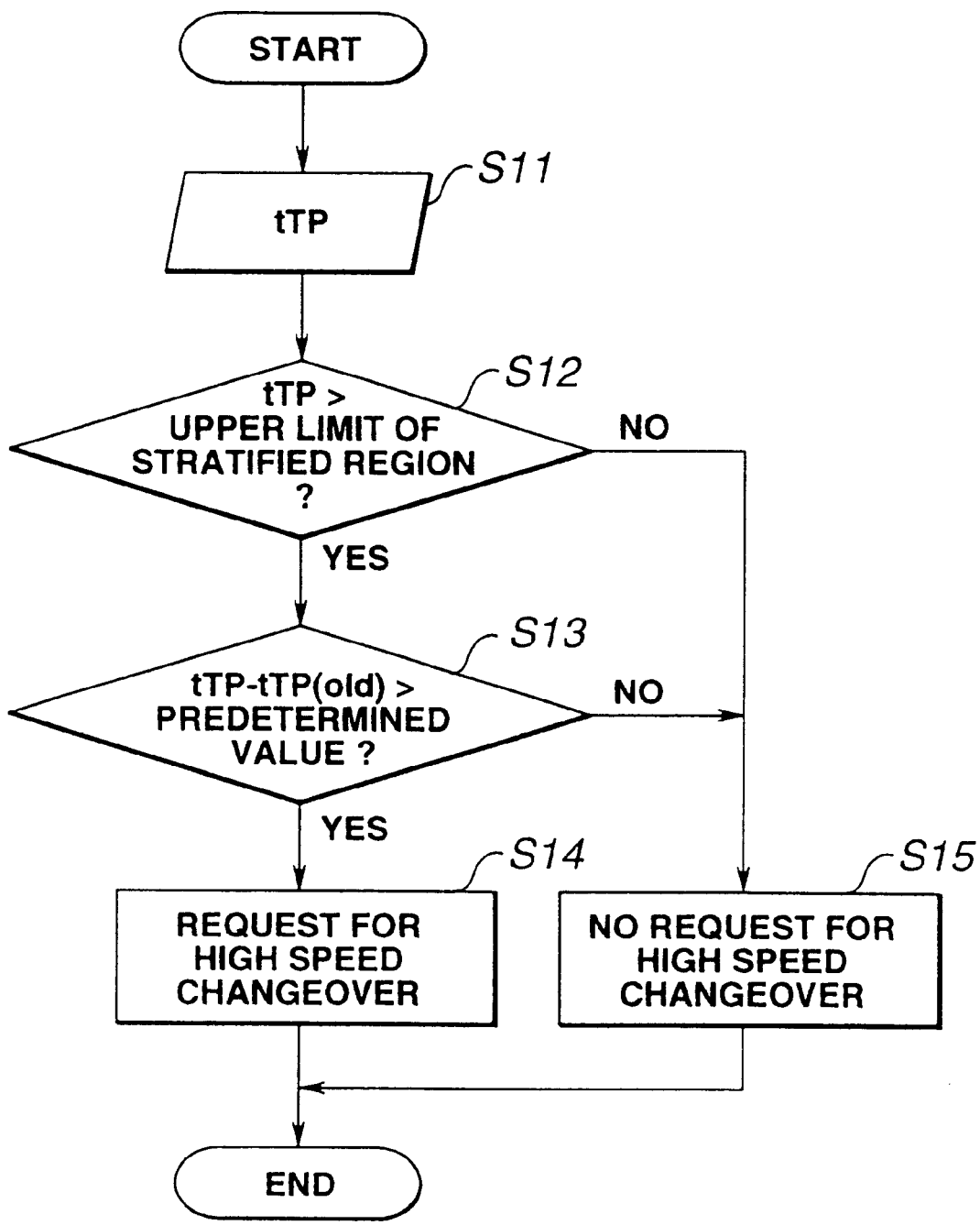
FIG. 5 is a flowchart showing a routine for the control unit of FIG. 2 to determine whether there is a high speed changeover request.

FIG. 5 shows a high speed changeover requesting process of the section C.

At a step S11, the control unit 11 reads the standard target intake air quantity tTP (calculated by the standard target intake air quantity calculating section H). (The standard target intake air quantity tTP corresponds to the intake air flow rate or the fuel injection pulse width in the engine operation with the theoretical air fuel ratio.)

At a step S12, the control unit 11 determines whether the standard target intake air quantity tTP obtained at the step S11 is greater than an upper limit value of a stratified combustion region. (That is, it is determined whether the accelerator pedal is depressed to a degree greater than a predetermined depression degree.) When the standard intake air quantity tTP is equal to or smaller than the predetermined upper limit value, the control unit 11 judges that there are neither a request for a combustion changeover from the stratified combustion to the homogeneous combustion nor a request for rapid (or hard) acceleration, so that the continuation of the stratified combustion mode is appropriate, and therefore proceeds to a step S15. The control unit 11 takes action, at the step S15, to signal that there is no request for a high speed changeovers and then terminates the control flow of FIG. 5.

When the standard intake air quantity tTP is greater than the predetermined upper limit value, the control unit 11 judges that the continuation of the stratified combustion mode is inappropriate, and that there is a need for a combustion changeover from the stratified mode to the homogeneous mode, and hence proceeds from the step S12 to a step S13.

At the step S13, the control unit 11 determines whether a difference between a current value (tTP) of the standard intake air quantity and a previous value (tTP(old)) of the standard target intake air quantity is greater than a predetermined difference value (to discriminate between a request for hard or rapid acceleration, and a request for light or moderate acceleration). If the answer of the step S13 is YES, then the control unit 11 proceeds to a step S14. If it is NO, then the control unit 11 proceeds from the step S13 to the step S15. That is, in the case of a request for moderate acceleration, the control system signals the nonexistence of a request for rapid acceleration at the step S15 and terminates the control flow, thereby to allow a normal gradual changeover of the combustion mode from the stratified mode to the homogeneous mode.

At the step S14, the control unit 11 produces a request signal indicating the existence of a request for rapid acceleration and terminates the control flow. The control system uses this signal to respond quickly and responsively to the rapid acceleration request. Thus, this control system can judge that there is a driver's demand for rapid acceleration when the driver depresses the accelerator pedal so hard that the depression degree is equal to or greater than a predetermined depression degree and the depression speed (or rate) is equal to or higher than a predetermined speed.

A combustion changeover judging section D compares the phase delayed equivalence ratio TFBYAH with a predetermined threshold, and thereby produces a combustion changeover command signal to command an actual changeover of the requested combustion mode changeover, in dependence on the result of the comparison. When, during an operation in the stratified combustion mode, the delayed target equivalence ratio TFBYAH becomes equal to or greater than the threshold, the control system carries out a combustion changeover from the stratified mode to the homogeneous mode by changing the fuel injection timing and the ignition timing. A combustion changeover from the homogeneous mode to the stratified mode is performed when the delayed target equivalence ratio TFBYAH becomes lower than the threshold during an engine operation in the homogeneous mode. The section D serves as the transient state detecting means 102 of FIG. 1.

In a forbidden range setting section E and a limiter processing section F, the following operations are performed.

(i) After a decision of the combustion mode changeover judging section D to change over the combustion mode from the stratified mode to the homogeneous mode (or after detection of a homogeneous lean combustion condition immediately following a changeover from the stratified mode to the homogeneous mode), the control unit 11 checks whether continuation of the engine operation along the delayed equivalence ratio TFBYAH would incur passage through a predetermined unstable combustion region (or range).

Figure 6:
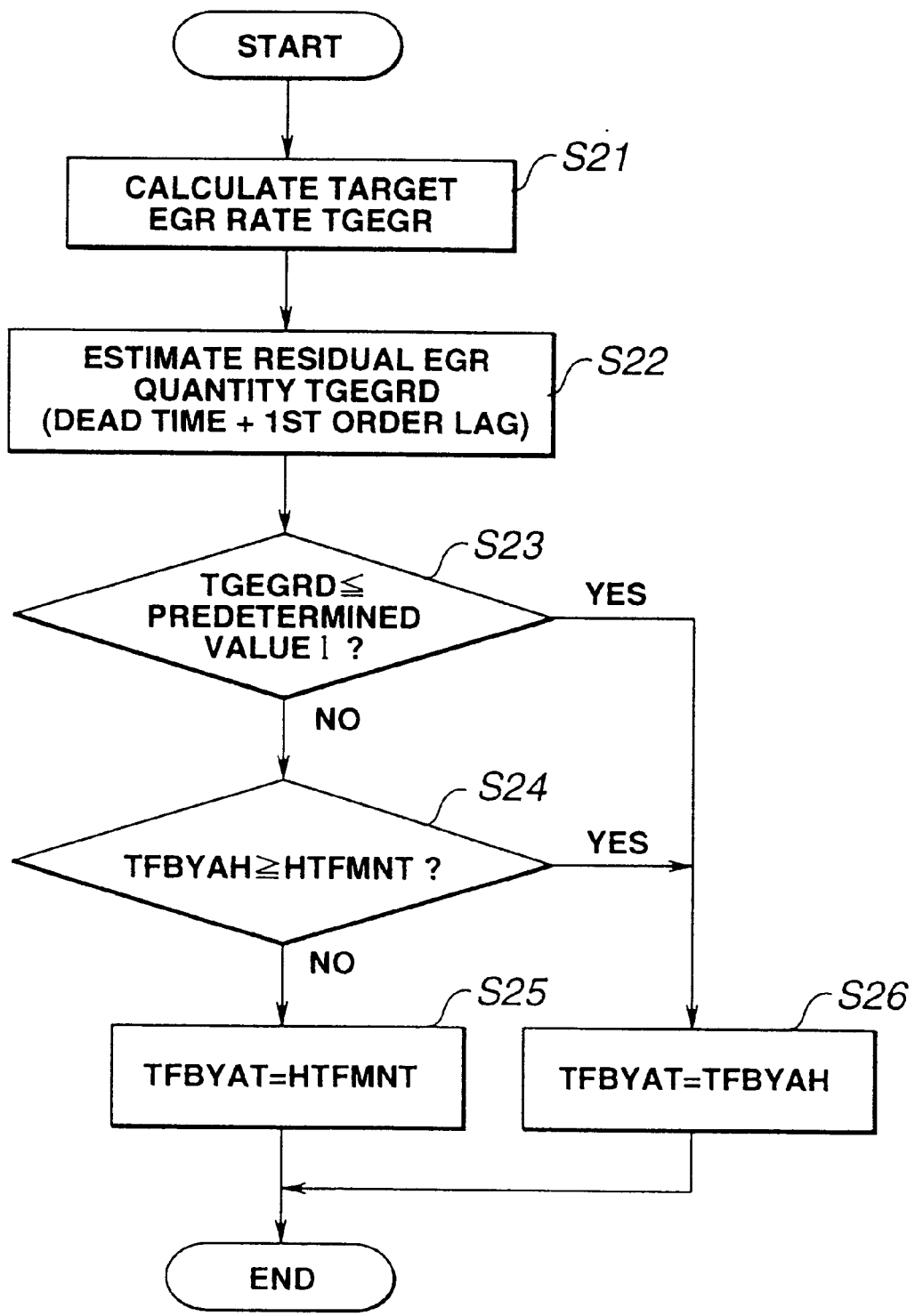
FIG. 6 is a flowchart showing a limiting operation of the control unit of FIG. 2.
Figure 7:
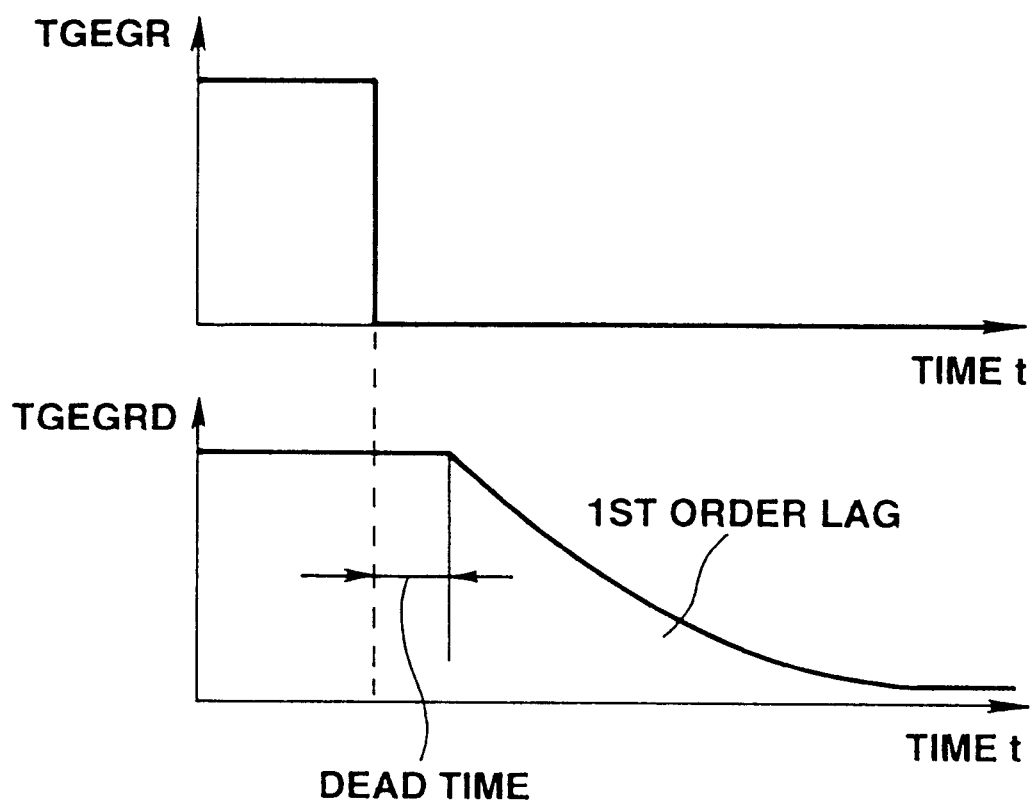
FIG. 7 is a time chart showing estimation of EGR quantity by the control unit of FIG. 2.

In this example, the control unit 11 predicts the instability of the combustion by following the process of FIG. 6. At steps S21 and S22, the control unit 11 estimates a residual EGR gas quantity TGEGRD of the EGR gas remaining in the intake system at the time of the judgement of the judging section D of the combustion changeover from the stratified mode to the homogeneous mode. In this example, the control unit 11 first, at the step S21, obtains an EGR quantity (a target EGR quantity such as a target EGR rate TGEGR) determined in accordance with the engine operating conditions (such as the engine speed and the engine load) immediately before the combustion changeover. Then, at the step S22, the control unit 11 determines the estimated residual EGR quantity TGEGRD by introducing a dead time and a first order lag to the EGR quantity TGEGR. FIG. 7 shows a response of the estimated residual EGR gas quantity TGEGRD representing the actual EGR gas quantity to a step change in the target EGR quantity TGEGR represented by the EGR control signal. The dead time corresponds to a delay time from a combustion changeover request to a start of motion of the EGR control valve 15, and the first order lag corresponds an operation characteristic of the EGR control valve 15 and other factors. Instead of such estimation of the residual EGR quantity, it is possible to employ a sensor for sensing an EGR quantity by sensing an EGR gas flow in the EGR passage 14.

At a step S23, the control unit 11 checks whether the estimated (or sensed) residual EGR gas quantity TGEGRD is greater than a predetermined value 1 or not, to judge whether the control system can secure stable combustion.

(ii) When the residual EGR quantity TGEGRD is greater than the predetermined value and therefore the judgement of the step S23 is that it is difficult to sustain stable combustion, the control unit 11 further checks, at a step S24, whether the current delayed target equivalence ratio TFBYAH (corrected by a first order lag) is equal to or greater than a predetermined high speed combustion changeover transient state limiter ratio HTFMNT (the ratio capable of ensuring stable combustion ). When the current delayed target equivalence ratio TFBYAH is smaller than the limiter ratio HTFMNT, the control unit 11 changes a desired equivalence ratio TFBYAT from the current delayed target equivalence ratio TFBYAH to the limiter ratio HTFMNT in a manner of a step change at a step S25.

If the residual EGR quantity TGEGRD is equal to or smaller than the predetermined value 1 or if the delayed target equivalence ratio TFBYAH is equal to or greater than the limiter ratio HTFMNT, the control unit 11 continues the gradual increase along the delayed target equivalence ratio TFBYAH by holding the desired equivalence ratio TFBYAT equal to the delayed equivalence ratio TFBYAH at the step S26.

(iii) The step increase of the desired equivalence ratio TFBYAT from the current value of the delayed ratio TFBYAH to the limiter ratio HTFMNT enriches the air fuel mixture and tends to increase the engine output torque, as compared to the normal operation along the delayed target equivalence ratio TFBYAH.

Therefore, an ignition timing modifying section G shown in FIG. 3 changes the ignition timing from the value determined in accordance with the delayed target equivalence ratio TFBYAH, in a manner of a step change to retard the ignition timing and thereby to prevent unwanted torque variation. The section G serves as the ignition timing modifying means105.

Figure 4:
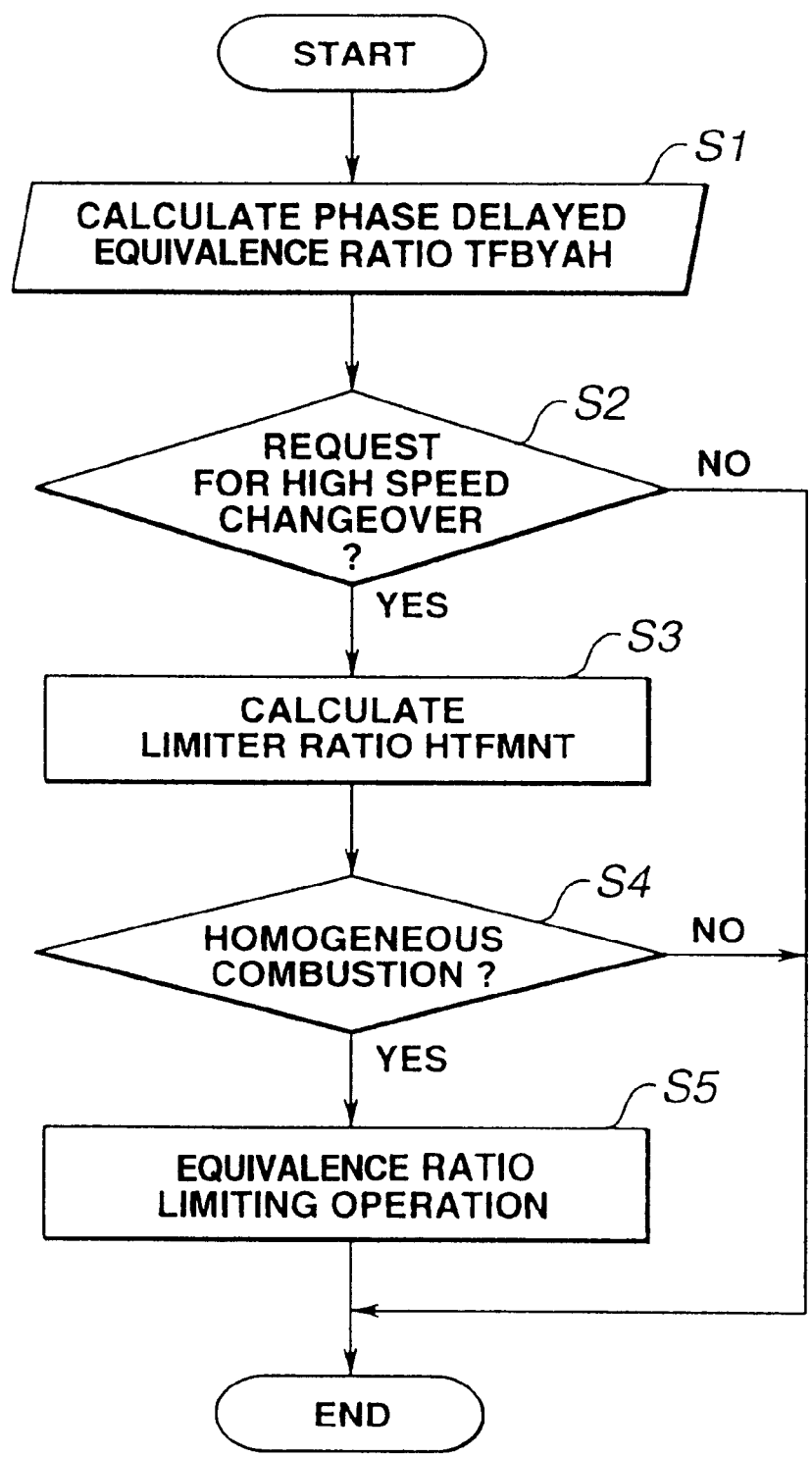
FIG. 4 is a flowchart showing a control procedure performed by a control unit of FIG. 2.

FIG. 4 is a flowchart for illustrating the control process according to this practical example of the invention.

At a step S1, the control unit 11 calculates the basic target equivalence ratio TFBYAB in accordance with the engine operating conditions such as the engine speed and engine load by retrieval from the maps, and further calculates the delayed target equivalence ratio TFBYAH from the basic target equivalence ratio TFBYAB. The delayed target equivalence ratio TFBYAH is designed to start varying gradually in response to a step change of the basic target equivalence ratio TFBYAB.

At a step S2, the control unit 11 checks if there is a high speed changeover request by performing the process of FIG. 5. The control unit 11 proceeds from the step S2 to a step S3 if there is the high speed acceleration request, and terminates the process of FIG. 4 if there is no high speed changeover request.

At the step 53, the control unit 11 calculates the limiter ratio HTFMNT for limiting the equivalence ratio in the transient state in the high speed combustion changeover. (For example, the limiter ratio HTFMNT may be set equal to a lean limit of the target equivalence ratio in the steady state homogeneous combustion.) Then, the control unit 11 proceeds to a next step S4. The limiter ratio HTFMINT may be a fixed value for ensuring stable combustion irrespective of the engine operating conditions. Alternatively, the limiter ratio HTFMINT may be a variable and the control system may be arranged to determine the limiter ratio HTFMINT in accordance with one or more engine operating conditions (by using one or more maps, for example).

At the step S4, the control unit 11 checks whether the current combustion mode is the homogeneous mode or not, by checking the result of judgement on combustion changeover at the combustion changeover judging section D. The control system proceeds to a step S5 if the answer of the step S4 is YES, and terminates the process of FIG. 4, following the judgment that there is no need for the equivalence ratio limiting operation if the answer of the step S4 is NO.

At the step S5, the control system carries out the equivalence ratio limiting operation (according to the process of FIG. 6), and then terminates the process of FIG. 4.

Figure 8:
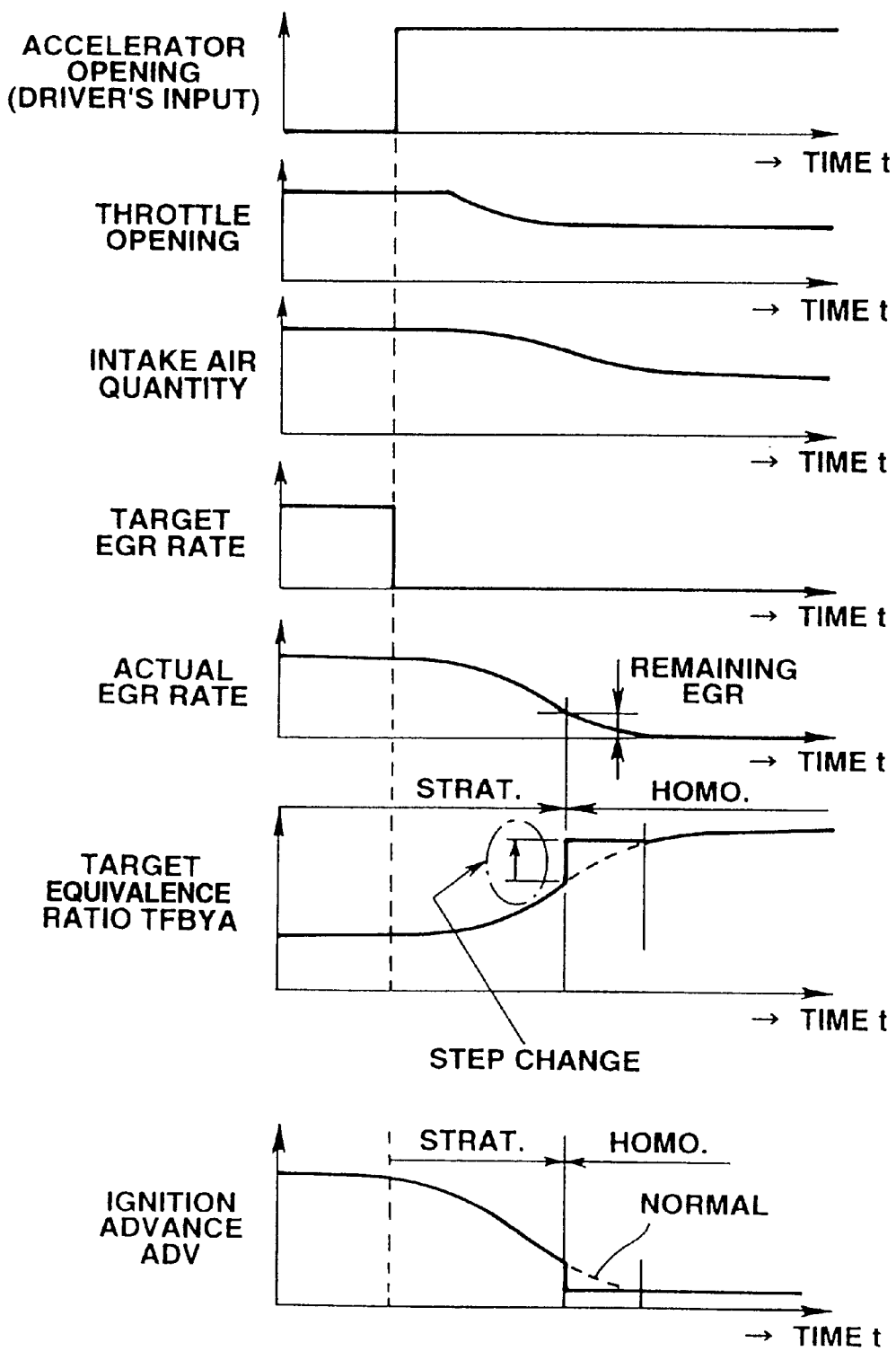
FIG. 8 is a time chart illustrating control behavior of the engine system of FIG. 2 in a combustion changeover.
Figure 9:
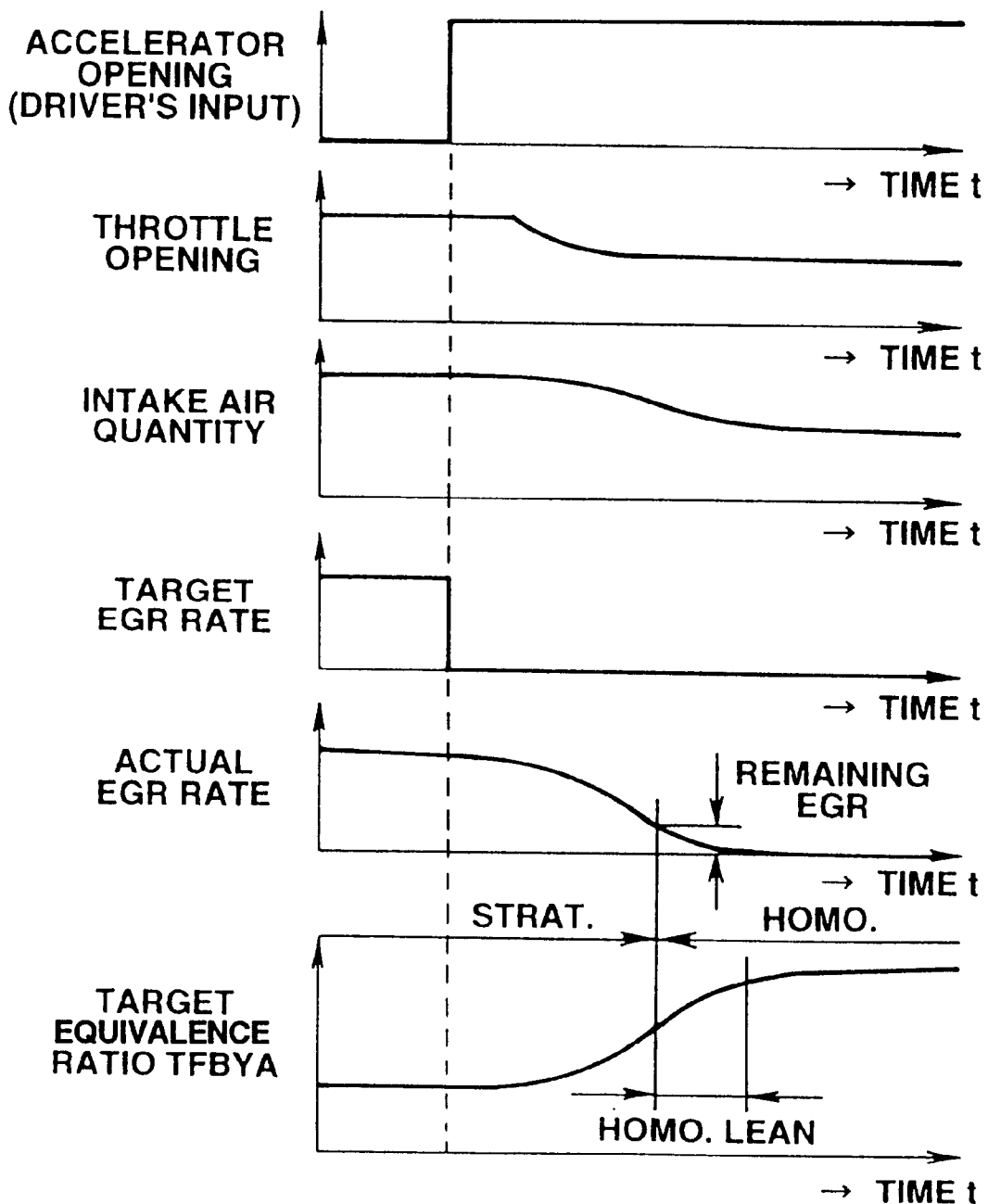
FIG. 9 is a time chart illustrating, as an comparative example, control behavior resulting from omission of a step change of the equivalent ratio.

As shown in FIG. 8, the control system of this example checks whether the target equivalence ratio is in a predetermined unstable combustion region in a transient state following a start of a changeover from the stratified combustion to the homogeneous combustion, and increases the target equivalence ratio steeply like a step change to the stable combustion region when the equivalence ratio enters the unstable combustion region. By so doing, the control system can avoid the adverse influence detrimental to the homogeneous combustion, by the residual EGR gas. In the comparative example of FIG. 9, by contrast, the stability of combustion in the homogeneous lean mode is readily affected by the residual EGR gas.

Furthermore, the control system of this example is arranged to modify the ignition timing in accordance with the step change of the target equivalence ratio. Therefore, the control system can maintain the stability of the engine combustion, prevent unwanted torque fluctuation due to enrichment of the target equivalence ratio, and achieve smooth driveability.

The control system of this example is further arranged to effect the forcible step increase of the target equivalence ratio only when there is a request for rapid acceleration, and allows the target equivalence ratio to increase gradually in the situation of moderate acceleration or steady state. The control system can respond responsively to a request for rapid acceleration while on the other hand the control system can improve the fuel efficiency and exhaust performance to the greatest possible degree in the moderate acceleration and in the steady state driving.

The control system of this example controls the intake air quantity and the fuel supply quantity to the engine by using the thus-determined equivalence ratio in the following manner.

A standard target intake air quantity calculating section H shown in FIG. 3 receives, as input parameters, the accelerator operation quantity APS and the engine speed Ne, or the target torque tTe (calculated from APS and Ne) and the engine speed Ne, and calculates a standard target intake air quantity tTP in accordance with the input parameters, for example, by retrieval from a map. The standard target intake air quantity tTP is the intake air quantity determined by the theoretical air fuel ratio as the standard equivalence ratio. The standard target intake air quantity tTP may be in the form of any one of a basic fuel injection quantity (injection pulse width) corresponding to the intake air quantity for each intake stroke, the intake air quantity for each intake stroke, and the intake air quantity per unit time (sensed by the air flow sensor 3).

A target intake air quantity calculating section I of FIG. 3 calculates a target intake air quantity tTP' corresponding to the basic target equivalence ratio TFBYAB. It is possible to determine the target intake air quantity tTP' simply by dividing the standard intake air quantity tTP by the basic target equivalence ratio TFBYAB. In the example of FIG. 3, however, the section I determines the target intake air quantity tTP' by dividing the standard intake air quantity tTP by the product of the basic target equivalence ratio TFBYAB and a combustion efficiency ITAF. That is, tTP'=tTP/ (TFBYAB·ITAF). The combustion efficiency differs in dependence on the difference of the basic target equivalence ratio TFBYAB from the standard equivalence ratio, and the required fuel quantity depends on the combustion efficiency. With a correcting operation to take account of the combustion efficiency ITAF, the control system of this example can determine the target intake air quantity tTP' so as to fulfil both the requirement of the target torque and the requirement of the target equivalence ratio simultaneously.

A target throttle valve opening calculating section J of FIG. 3 receives the target intake air quantity tTP' and the engine speed Ne, and calculates a target throttle valve opening degree tTPS therefrom. The target throttle valve opening degree tTPS is an opening degree of the throttle valve 9 required to achieve the target intake air quantity tTP'. The section J produces a throttle control signal (or intake air control signal) representing the target throttle opening degree tTPS, and delivers the throttle control signal to the throttle control unit 10. In response to the throttle control signal, the throttle control unit 10 drives the throttle valve 9 to make the actual throttle opening degree equal to the target throttle opening degree tTPS.

The fuel supply quantity is calculated by a basic fuel supply quantity calculating section Ki and a fuel quantity correcting section K2.

The basic fuel supply quantity calculating section K1 of this example receives the engine speed Ne and the intake air quantity Q per unit time sensed by the air flow sensor 3, and calculates a basic fuel injection pulse width TP in accordance with the engine speed Ne and the sensed per-unit-time intake air quantity Q. The basic fuel injection pulse width TP corresponds to the intake air quantity per one intake stroke at the theoretical air fuel ratio (standard equivalence ratio). The basic fuel supply quantity calculating section K1 may be configured to determine an actual intake air quantity per cylinder from the sensed intake air quantity Q by introducing a lag element representing a transportation (distance/ velocity) lag of the intake air from the position of the air flow sensor 3 to each engine cylinder, and to determine the basic fuel injection pulse width TP by using the actual intake air quantity per cylinder.

The fuel quantity correcting section K2 calculates an effective fuel injection pulse width TE by multiplying the basic pulse width TP by the desired equivalence ratio TFBYAT, and further calculates a final fuel injection pulse width TI by adding an ineffective pulse width TS corresponding to a battery voltage. The desired equivalence ratio TFBYAT is set equal to the delayed target equivalence ratio TFBYAH when the equivalence limiter operation is not carried out, and equal to the limiter ratio HTMNT when the equivalence limiter operation is carried out.

The fuel quantity correcting section K2 delivers a fuel injection pulse signal (or fuel control signal) of the final pulse width TI to the fuel injector 6, and the fuel injector 6 injects the fuel in the quantity corresponding to the desired equivalence ratio, directly into the cylinder in response to the fuel injection pulse signal.

Figure 10:
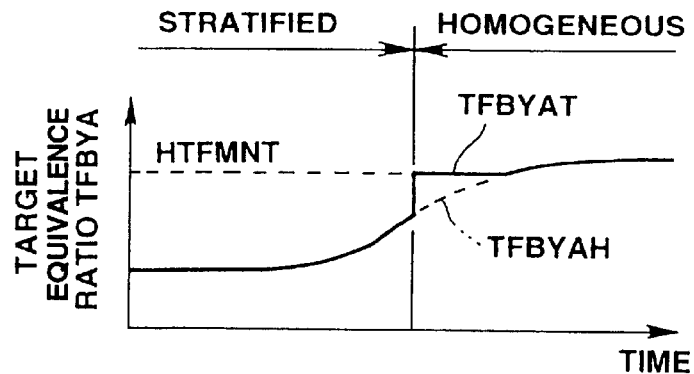
FIG. 10 is a time chart showing a step change in the equivalence ratio shown in FIG. 8 in an enlarged manner.

FIG. 10 shows more in detail the step change in the equivalence ratio shown in FIG. 8. The desired equivalence ratio TFBYAT is changed abruptly away from the delay target equivalence ratio TFBYAH, to the limiter ratio HTFMNT.

Figure 11:
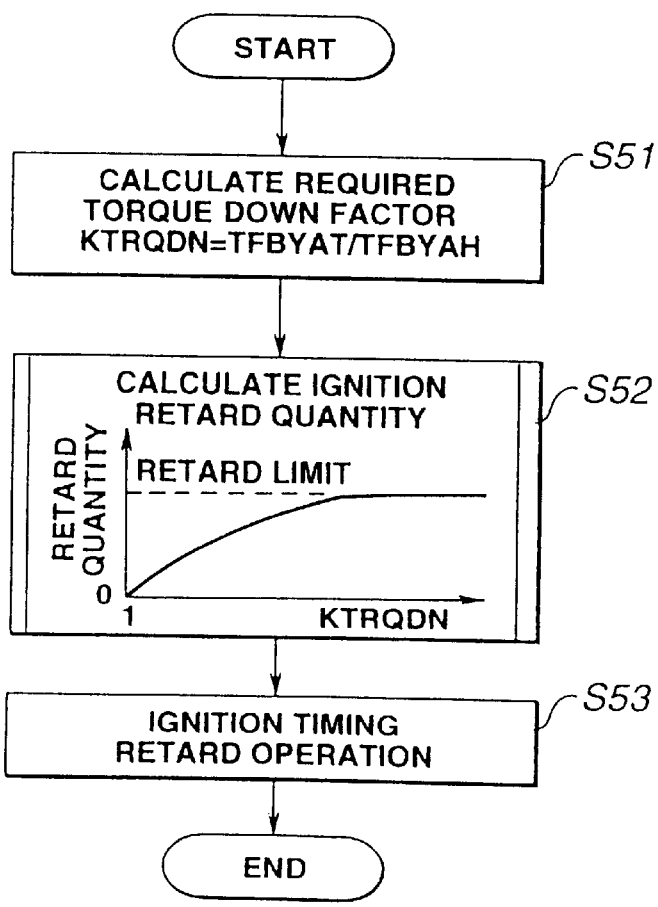
FIG. 11 is a flowchart showing an ignition timing modification routine performed by the control unit of FIG. 2.

The control system of this example retards the ignition timing as shown in FIG. 11.

At a step S51, the control unit 11 calculates a required torque down factor KTRQDN from the desired equivalence ratio TFBYAT (set equal to the limiter ratio HTFMNT by the step change) and the delayed equivalence ratio TFBYAH. In this example, KTRQDN=TFBYAT/TFBYAH. The required torque down factor KTRQDN is increased abruptly from 1 by the step change in the desired equivalence ratio TFBYAT beyond the delayed ratio TFBYAH. The required torque down factor KTRQDN decreases gradually toward 1 as the difference between TFBYAT and TFBYAH is reduced to zero.

At a step S52, the control unit 11 determines an ignition timing retard quantity from the required torque down factor KTRQDN by retrieval from a map. The retard quantity is zero when TFBYAT=TFBYAH, and KTRQDN=1. As the required torque down factor KTRQDN increases, the retard quantity increases up to a retard limit.

At a step S53, the control unit 11 determines a desired ignition timing by calculating a basic ignition timing in accordance with the engine speed and the cylinder intake air quantity by retrieval from a map and by modifying the basic ignition timing in accordance with the retard quantity determined at the step S52. The control unit 11 produces the ignition control signal in accordance with the thus-determined desired ignition timing, and controls the ignition system to achieve the desired ignition timing.

Figure 12:
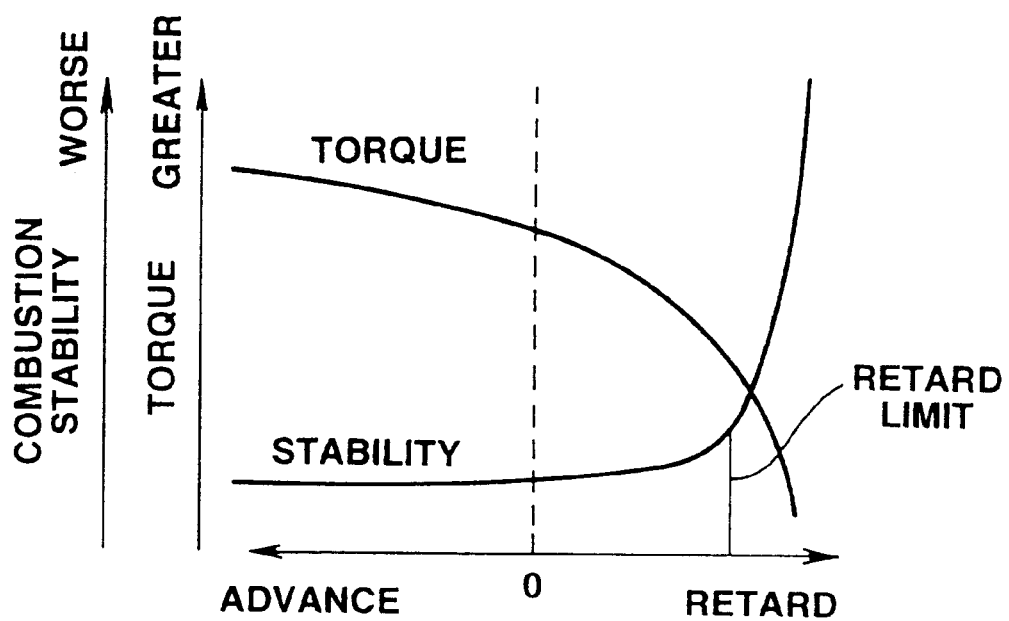
FIG. 12 is a graph showing an ignition retard limit shown in FIG. 11.

The retard limit is determined as shown in FIG. 12. The stability of combustion becomes worse as the retard quantity increases. The retard limit is a maximum retard quantity capable of maintaining stable combustion.

In the illustrated example, the control system produces the step increase of the equivalence ratio to lessen the influence of the EGR gas on the combustion stability. The present invention is not limited to this example. It is optional to arrange the control system to protect the stability of combustion against influence of a transient condition of the SCV system or the VTC system. The SCV and VTC systems tend to lag in a combustion changeover, and the lag in the SCV or VTC system can deteriorate the stability of combustion. The control system estimates a transient SCV condition in accordance with the opening of the swirl control valve, or a transient VTC condition of the VTC system, judges whether it is possible to ensure the combustion stability by monitoring the transient SCV or VTC condition, and produces a step change of the equivalence ratio to a limiter ratio required to secure the stable combustion. This limiter ratio may be determined for each of the EGR, SCV and VTC systems, or alternatively the same limiter ratio may be used for the EGR, SCV and VTC systems.

The accelerator position sensor 1 and the accelerator pedal of the vehicle serve as an input device for producing an accelerator input signal representing a driver's accelerator input or driver's demand for acceleration. From the accelerator input signal, the control unit 11 can determine a parameter representing the driver's accelerator input or demand. The basic target equivalence calculating section A shown in FIG. 3 can serve as a selecting section for monitoring the engine load parameter (such as tTe) and producing a combustion changeover request signal by changing the basic target equivalence ratio between a target ratio for the stratified combustion mode and a target ratio for the homogeneous mode.

According to the embodiment of the invention, the control system is arranged to producing a changeover request signal requesting a combustion changeover from the stratified combustion mode to the homogeneous combustion mode in accordance with the engine load operating parameter. In response to the combustion changeover request signal, the control system changes a target fuel air ratio (such as TFBYAB) from a first target ratio for the stratified combustion mode to a second target ratio for the homogeneous combustion mode, changes the intake air control signal (such as tTP' or the throttle control signal) from a first target air quantity level corresponding to the first target ratio to a second target air quantity level corresponding to the second target ratio, starts to increase a desired fuel air ratio (such as TFBYAT held equal to TFBYAH) from the first target ratio toward the second target ratio gradually with time, controls the fuel control signal in accordance with the desired fuel air ratio signal, changes the EGR control signal from a stratified mode EGR level for the stratified mode to a homogeneous lean mode EGR level to reduce the EGR quantity to zero, and starts to decrease an estimated residual EGR quantity (TGEGRD) representing an actual residual EGR gas quantity gradually from the stratified mode EGR level to zero with time. Then, the control system produces a combustion changeover command signal to allow the combustion changeover responsive to the combustion changeover request signal when the desired fuel air ratio (such as TFBYAT=TFBYAH) becomes equal to or greater than a predetermined threshold. In response to this command signal, the control system increases the desired fuel air ratio abruptly from the threshold level to a predetermined enriched level (such as HTFMNT) to improve stability of combustion if the residual EGR quantity is still equal to or greater than a predetermined value detrimental to the stability of combustion.

The engine control system according to the present invention can control the equivalence ratio (or fuel air ratio) adequately in a combustion changeover between the stratified combustion mode and the homogeneous combustion mode.

The engine control system of the before-mentioned Japanese Patent Provisional Publication No. 62(1987)-110536 is arranged to determine the target throttle opening only from the calculated target engine torque and the engine speed, so that this system is unable to control the equivalence ratio adequately in accordance with the engine operating conditions. In order to vary the fuel air ratio while holding the engine speed and the engine torque unchanged, it is necessary to vary both the throttle opening and the fuel supply quantity. When the air fuel ratio is lean, for example, the required intake air quantity increases as compared to the quantity corresponding to the theoretical air fuel ratio, and the required fuel quantity decreases. This conventional engine control system cannot meet this requirement.

The control system according to the present invention is arranged to control the air fuel ratio and the engine torque desirably by controlling the intake air quantity and the fuel supply quantity. Specifically, with the phase delay correction, the control system can vary the air fuel ratio in such a smooth manner that the engine torque remains substantially constant or varies smoothly.

The engine system according to the embodiment of the invention comprises at least one of the EGR system, the SCV (swirl control valve) system and the VTC (variable valve timing control) system. In a combustion changeover between the stratified mode and the homogeneous mode, the control system changes the control condition of at least one of these systems. The optimum SCV opening (the opening of a swirl control valve for controlling air flow in a combustion chamber), the optimum VTC condition (opening and closing timings of intake and exhaust valves and overlap) and the optimum EGR condition (such as external and internal EGR rates or ratios) are different between the stratified mode and the homogeneous mode. The control system can improve emission characteristic and combustion stability, by adapting these control conditions to the selected combustion mode.

In the illustrated example, the control system carries out the external EGR in the stratified mode to reduce NOx. In the homogeneous combustion immediately after a combustion changeover from the stratified mode, the control system prohibits the external EGR because the air fuel ratio is extremely lean and the EGR is detrimental to the combustion. In this combustion state, the NOx emission level is relatively low, and the lean burn operation can improve the fuel economy and at the same time restrain the quantity of NOx.

The control of the EGR, SCV and VTC conditions is more difficult in transition between the stratified mode and the homogeneous mode than in a steady state. Each system involves a response delay.

In general, the response time of the SCV or VTC system is several hundred ms. Therefore, in the case of a combustion changeover from the stratified mode to the homogeneous mode responsive to a driver's acceleration request, the engine system, if arranged to change over the equivalence ratio in pace with the response of each device (by waiting until completion of a changeover operation of each device), would cause delay in timing and hesitation with respect to the acceleration request.

If, on the other hand, arranged to change over the equivalence ratio quickly to improve the accelerating ability, the engine system would change the equivalence ratio earlier than the response of the EGR condition and tend to deteriorate the combustion. In the changeover from the stratified mode to the homogeneous mode, for example, the response delay would cause residual EGR gas and the combustion would be made worse by the residual EGR gas flowing into the combustion chamber even if a command signal is produced to stop the EGR immediately at the end of the stratified mode. Specifically in the homogeneous lean combustion mode immediately after the changeover from the stratified mode to the homogeneous mode, the residual EGR gas is more influential adversely against the combustion because the air fuel mixture is made lean close to the combustion stability limit. The control system according to the invention can control the equivalence ratio adequately to ensure the stability of combustion even in transition from the stratified mode to the homogeneous mode.

This application is based on prior Japanese Patent Application No. 9(1997)-177260. The entire contents of this Japanese Patent Application No. 9-177260 (filed on Jul. 2, 1997 in Japan) are hereby incorporated by reference.

What is claimed is:

1. Apparatus for changing combustion in an internal combustion engine between a stratified charge combustion mode and a homogeneous charge combustion mode, the apparatus comprising:

a controller for varying a fuel/air ratio gradually from a first ratio level for the stratified charge combustion mode to a second ratio level for the homogeneous charge combustion mode to achieve a changeover from the stratified mode to the homogeneous mode, and for changing the fuel/air ratio steeply toward the second ratio level, instead of varying the fuel/air ratio gradually, when the fuel air ratio enters a predetermined unstable range in a transient state during transition from the stratified combustion mode to the homogeneous combustion mode.

2. The apparatus according to claim 1 wherein the controller comprises:

a condition discriminating section for producing a discrimination signal when the fuel/air ratio enters the unstable range in the transient state during transition from the stratified combustion mode to the homogeneous combustion mode; and a controlling section for increasing the fuel/air ratio gradually from the first ratio level to the second ratio level when the discrimination signal is absent, and for interrupting a gradual increase of the fuel/air ratio and instead producing a forcible steep change in the fuel air ratio to increase the fuel air ratio to an enriched level outside the unstable range when the discrimination signal is present.

3. The engine control process according to claim 2 wherein the controlling section comprises an ignition modifying section for modifying an ignition timing of the engine in accordance with the forcible steep change in the fuel/air ratio.

4. The apparatus according to claim 2 wherein the condition discriminating section produces a ratio condition signal when the fuel air ratio is in the unstable range, produces a transient condition signal when the transient state unfavorable to stability of combustion is detected during transition from the stratified combustion mode to the homogeneous combustion mode, and produces the discrimination signal when the ratio condition signal and the transient condition signal are both present.

5. The apparatus according to claim 4 wherein the condition discriminating section monitors a transient condition in transition from the stratified combustion mode to the homogeneous combustion mode, and produces the transient condition signal in accordance with the transient condition.

6. The apparatus according to claim 5 wherein the transient condition is an EGR quantity of the engine, and the condition discriminating section produces the transient condition signal in accordance with the EGR quantity which is one of an internal EGR quantity, an internal EGR rate, an external EGR quantity and an external EGR rate.

7. The apparatus according to claim 2 wherein the condition discriminating section produces an acceleration condition signal in accordance with a demand for acceleration, and allows generation of the discrimination signal when the acceleration condition signal is present.

8. The apparatus according to claim 2 wherein the controlling section comprises a fuel air ratio control section for producing a fuel air ratio control signal representing a desired fuel air ratio which is increased gradually from the first ratio level to the second ratio level in the absence of the discrimination signal, and which is increased abruptly in a manner of a step change in response to the discrimination signal, and the controlling section further comprises a fuel control section for producing a fuel control signal for controlling a fuel supply quantity to the engine in accordance with the fuel air ratio control signal to achieve the desired fuel air ratio.

9. The apparatus according to claim 8 wherein the controller further comprises a selecting section for monitoring an engine load parameter representing an engine load of the engine and producing a stratified-to-homogeneous combustion changeover request signal in accordance with the engine load parameter, the controlling section further comprises an intake air control section for producing an air control signal for controlling an intake air quantity to the engine and for changing the air control signal from a first air control level for the stratified mode to a second air control level for the homogenous mode in response to the stratified-to-homogeneous combustion changeover request signal, and the fuel air ratio control section is configured to produce a delayed signal representing a delayed fuel air ratio varying gradually from the first ratio level to the second ratio level in response to the stratified-to-homogeneous combustion changeover request signal, and to set the desired fuel air ratio equal to the delayed fuel air ratio in the absence of the discrimination signal, and equal to the enriched level in response to the discrimination signal.

10. The apparatus according to claim 9 wherein the controlling section further comprises an ignition modifying section for controlling an ignition timing of the engine by producing an ignition control signal, and retarding the ignition timing in a manner of a step change simultaneously with the forcible steep change in the fuel/air ratio; wherein the condition discriminating section produces a ratio condition signal in response to the delayed fuel air ratio being in the unstable range, produces a transient condition signal in accordance with a transient condition in transition from the stratified combustion mode to the homogeneous combustion mode, and produces the discrimination signal when the ratio condition signal and the transient condition signal are both present; and wherein the controller receives an accelerator input signal representing a demand for acceleration, and the condition discriminating section produces an acceleration condition signal by monitoring the demand for acceleration when rapid acceleration is demanded, and allows generation of the discrimination signal when the acceleration condition signal is present.

11. The apparatus according to claim 10 wherein the apparatus further comprises the internal combustion engine, a fuel system for controlling the fuel supply quantity to the engine in response to the fuel control signal of the controller, an intake system for controlling the intake air quantity to the engine in response to the air control signal of the controller, an ignition system for controlling the ignition timing in response to the ignition control signal and a group of input devices for collecting input information to determine the engine load parameter and an acceleration demand parameter representing the demand for acceleration and supplying the input information to the controller.

12. The apparatus according to claim 11 wherein the apparatus further comprises an EGR system for recirculating an exhaust gas mixture, as EGR gas, from an exhaust system to the intake system of the engine and for controlling an EGR gas quantity in response to an EGR control signal produced by the controller, and the controller is configured to determine an estimated residual EGR gas quantity after a changeover from the stratified mode to the homogeneous mode in accordance with a magnitude of the EGR control signal, and to produce the transient condition signal in accordance with the residual EGR gas quantity.

13. A process for changing combustion in an internal combustion engine between a stratified charge combustion mode and a homogeneous charge combustion mode, the process comprising:

a controlling step of varying a fuel/air ratio gradually from a first ratio level for the stratified charge combustion mode to a second ratio level for the homogeneous charge combustion mode to achieve a changeover from the stratified mode to the homogeneous mode, and for changing the fuel/air ratio steeply, instead of varying the fuel/air ratio gradually, out of a predetermined unstable range when the fuel air ratio enters the predetermined unstable range in a transient condition during transition from the stratified combustion mode to the homogeneous combustion mode.

14. The process according to claim 13 wherein the process comprising:

a condition discriminating step for producing a discrimination signal when a fuel/air ratio enters the unstable range in the transient condition during transition from the stratified combustion mode to the homogeneous combustion mode; and the controlling step for increasing the fuel/air ratio gradually from the first ratio level toward the second ratio level when the discrimination signal is absent, and for interrupting a gradual increase of the fuel/air ratio and instead producing a forcible steep change in the fuel air ratio to increase the fuel air ratio to an enriched level outside the unstable range when the discrimination signal is present.

15. The process according to claim 14 wherein the controlling step comprises an ignition modifying sub-step for retarding an ignition timing of the engine in accordance with the forcible steep change in the fuel/air ratio.

16. An engine system, comprising:

a direct injection type internal combustion engine comprising an engine cylinder;

an actuating system for operating the engine in one of a stratified charge combustion mode and a homogeneous charge combustion mode, the actuating system comprising a fuel injection system for injecting fuel directly into the engine cylinder and varying an actual fuel injection quantity to the engine cylinder in response to a fuel control signal, an intake system comprising a throttle valve for varying an intake air quantity to the engine cylinder in response to an intake air control signal, and an EGR system for recirculating an exhaust gas mixture of the engine to the intake system as an EGR gas and varying an EGR gas quantity in response to an EGR control signal;

an input device for collecting input information to determine an engine operating parameter indicative of an engine load; and a controller for producing a changeover request signal requesting a combustion changeover from the stratified combustion mode to the homogeneous combustion mode in accordance with the engine operating parameter, for responding to the combustion changeover request signal by changing a target fuel air ratio from a first target ratio for the stratified combustion mode to a second target ratio for the homogeneous combustion mode, by changing the intake air control signal from a first target air quantity level to achieve the first target ratio to a second target air quantity level to achieve the second target ratio, by starting to increase a desired fuel air ratio from the first target ratio toward the second target ratio gradually with time, by controlling the fuel control signal in accordance with the desired fuel air ratio signal, by changing the EGR control signal from a stratified mode EGR level for the stratified mode to a homogeneous lean mode EGR level to reduce the EGR quantity, and by starting to decrease an estimated residual EGR quantity representing an actual residual EGR gas quantity gradually from the stratified mode EGR level to the homogeneous lean mode EGR level with time, for producing a combustion changeover command signal to allow the combustion changeover responsive to the combustion changeover request signal when the desired fuel air ratio becomes equal to or greater than a predetermined threshold, and for responding to the combustion changeover command signal by increasing the desired fuel air ratio abruptly from the threshold level to a predetermined enriched level to improve stability of combustion if the residual EGR quantity is still equal to or greater than a predetermined value.

17. The engine system according to claim 16 wherein the actuating system further comprises an ignition system for controlling an ignition timing of the engine in response to an ignition control signal produced by the controller, and the controller is configured to produce a step increase in the desired fuel air ratio to abruptly increase an actual fuel air ratio of an air fuel mixture produced in the engine cylinder and simultaneously to produce a step change in the ignition timing to abruptly retard the ignition timing in response to the combustion changeover command signal.

18. The engine system according to claim 17 wherein the input device comprises a first device for producing an accelerator input signal in accordance with a driver's demand for acceleration, and the controller is configured to monitor the driver's demand for acceleration represented by the accelerator input signal and to allow the step increase in the desired fuel air ratio only when the accelerator input signal is in a predetermined condition demanding rapid acceleration.

* * * * *